(12) United States Patent
Specht et al.

(10) Patent No.: US 8,695,924 B2
(45) Date of Patent: Apr. 15, 2014

(54) AERODYNAMIC WING WITH IMPROVED LINE ATTACHMENT

(75) Inventors: Bernd Specht, Hanstedt (DE); Robert Drechsler, Schoenfeld (DE); Xaver Paulig, Hamburg (DE)

(73) Assignee: SkySails GmbH & Co. KG, Hamburg (DE)

( * ) Notice: Subject to any disclaimer, the term of this patent is extended or adjusted under 35 U.S.C. 154(b) by 359 days.

(21) Appl. No.: 12/995,161

(22) PCT Filed: May 30, 2008

(86) PCT No.: PCT/EP2008/056724
§ 371 (c)(1),
(2), (4) Date: Feb. 25, 2011

(87) PCT Pub. No.: WO2009/143901
PCT Pub. Date: Dec. 3, 2009

(65) Prior Publication Data
US 2011/0139053 A1    Jun. 16, 2011

(51) Int. Cl.
*B64D 17/02* (2006.01)
(52) U.S. Cl.
USPC .......................................................... 244/145
(58) Field of Classification Search
USPC ...... 244/153 R, 155 A, 138 R, 142, 145, 146, 244/902, 219, 123.11
See application file for complete search history.

(56) References Cited

U.S. PATENT DOCUMENTS 2,610,008 A * 9/1952 Smith ............................ 244/152
4,129,272 A * 12/1978 Jones et al. ................ 244/153 R
4,781,343 A * 11/1988 Brown ........................... 244/145
7,287,481 B1 10/2007 Wrage et al.

FOREIGN PATENT DOCUMENTS

DE    3801 098 A1 * 8/1989 ............ B64D 17/00
DE    4114520 C1    10/1992
DE    19957207 A1   5/2001
FR    2775656 A     9/1999
WO    WO 2005-100147 A    10/2005

OTHER PUBLICATIONS

International Search Report for PCT Application No. PCT/EP2008/056724, mailed Feb. 24, 2009, 2 pages.
Written Opinion for PCT Application No. PCT/EP2008/056724, mailed Feb. 24, 2009, 7 pages.

* cited by examiner

*Primary Examiner* — Joseph W Sanderson
*Assistant Examiner* — Timothy Schwarz
(74) *Attorney, Agent, or Firm* — Kilpatrick Townsend & Stockton LLP

(57) ABSTRACT

The invention relates to an aerodynamic wing, including an upper deck extending in operation in a longitudinal direction and in a transversal direction; wherein the upper deck is shaped and arranged to produce a vertical lifting force which is oriented perpendicular to the longitudinal and the transversal direction when the aerodynamic wing is exposed to a wind flow in a direction oriented parallel to the longitudinal direction; wherein a plurality of ribs are connected to the upper deck, said ribs lying in a plane parallel to the direction of the vertical lifting force and the direction of the wind flow; the aerodynamic wing being coupled to a base platform arranged below the wing in service via a plurality of fastening lines, whereby the fastening lines are secured to the ribs of the wing, at least two fastening lines are secured to one rib at two line attachment points arranged at a distance from each other in the longitudinal direction; wherein the at least two line attachment points are connected to each other by a reinforcing load transfer line extending from the line attachment point of the first one of the two fastening lines to the line attachment point of the second one of the two fastening lines; whereby the reinforcing load transfer line is attached to the respective rib along substantially the whole length of the load transfer line and follows a curved path along the rib.

12 Claims, 3 Drawing Sheets

AERODYNAMIC WING WITH IMPROVED LINE ATTACHMENT

CROSS-REFERENCE TO RELATED APPLICATIONS

This application is the U.S. National Stage entry under 371 of International Application No. PCT/EP08/056,724, filed May 30, 2008, the contents of which are herein incorporated by reference in their entirety for all purposes.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

The invention relates to an aerodynamic wing, comprising an upper deck extending in operation in a longitudinal direction and in a transversal direction; wherein the upper deck is shaped and arranged to produce a vertical lifting force which is oriented perpendicular to the longitudinal and the transversal direction when the aerodynamic wing is exposed to a wind flow in a direction oriented parallel to the longitudinal direction; wherein a plurality of ribs are connected to the upper deck, said ribs lying in a plane parallel to the direction of the vertical lifting force and the direction of the wind flow; the aerodynamic wing being coupled to a base platform arranged below the wing in service via a plurality of fastening lines.

Aerodynamic wings of the aforementioned design are adapted to form an aerodynamic profile in operation. Such aerodynamic wings according to the prior art are often provided with flexible upper and lower decks to allow folding and compacting of the wing for storing purposes. In operation, the aerodynamic wing is expanded to its aerodynamic profile design having a convex curvature of the upper deck and a concave curvature of the lower deck thus effecting an uplift force when exposed to a flow of air stream in a direction substantially parallel to the upper and lower deck. The uplift force is generated by a low pressure acting onto the upper deck and a high pressure acting onto the lower deck. The uplift force effects a pulling force onto the base platform. The base platform may be a stationary arrangement, which is e.g. adapted to transform the pulling force and a resulting veering out of one or more pulling cables connecting the base platform to the wing into another form of energy like electrical energy. Preferably, the base platform is a non-stationary arrangement like a watercraft, e.g. a person standing on a kiteboard or a commercial ship.

Often, in such aerodynamic wings one or more openings are provided in the front side of the wing to allow ram air to enter the wing inner space and to thus stabilize the aerodynamic wing profile.

A plurality of ribs serve to connect the upper and lower deck and to maintain a substantially constant distance between the upper and lower deck along the aerodynamic wing, namely to establish an aerodynamic profile of the wing. Usually, such ribs may be manufactured from a textile material to allow folding and compacting of the wing.

Further, such ribs are used for accommodating the line attachment points which are required to couple the aerodynamic wing to fastening lines coupling the wing to a base platform, a steering unit or the like to transfer the uplift force via the fastening lines.

Usually, each rib is oriented in a plane parallel to the direction of the vertical lifting force acting in the region of the rib and the direction of the wind flow at said region. Such rib will be oriented perpendicular to the upper and lower deck. However, diagonal ribs extending in an oblique but not perpendicular direction with respect to the upper and the lower deck may be provided. It is to be understood that the aerodynamic wing may have an overall curvature thus resulting in locally different directions of the lifting force whereby the sum of the lifting forces result in a direction and a magnitude of an overall lifting force. The above discussed orientations of the ribs refer to the respective local orientation of the decks.

Usually, the fastening lines are secured to the upper and lower deck via fastening points at the ribs. In particular in large scale aerodynamic wings forces of significant magnitude must be transferred via such fastening points. To provide operational safety, the ribs must provide high strength properties and still further may need reinforcement patches in the region of the fastening point. However, such high strength properties and reinforcement patches result in increased weight of the aerodynamic wing thus adversely affecting the efficiency of the aerodynamic wing.

Still further, it is known to increase the number of fastening lines to thus reduce the level of local stresses at the fastening points of each fastening line. However, such high number of fastening lines result in increased weight of the aerodynamic wing and its fastening lines thus also adversely affecting efficiency of the wing.

BRIEF SUMMARY OF THE INVENTION

The invention aims to solve the problem to provide a light weight aerodynamic wing being able to transfer high uplift forces via fastening lines to a base platform or the like.

To solve this problem an aerodynamic wing as discussed in the introductory portion of the description is provided, whereby the fastening lines are secured to the ribs of the wing, at least two fastening lines are secured to one rib at two line attachment points arranged at a distance from each other in the longitudinal direction; wherein the at least two line attachment points are connected to each other by a reinforcing load transfer line extending from the line attachment point of the first one of the two fastening lines to the line attachment point of the second one of the two fastening lines; whereby the reinforcing load transfer line is attached to the respective rib along substantially the whole length of the load transfer line and follows a curved path along the rib.

According to the invention the fastening lines are secured to the ribs of the wing. By this, the load transfer of the loads acting onto the upper deck is transferred via the ribs to the fastening lines thus allowing a far better stress distribution and stress transfer into the ribs and thus into these parts and avoiding stress peaks in the upper and lower deck. By this, it is possible to reduce the strength of the ribs and the upper deck and to consequently reduce the weight of the aerodynamic wing.

Still further, according to the invention, at least two fastening lines are secured to each rib in distance to each other and connected to each other by a reinforcing load transfer line.

This reinforcing load transfer line is attached to the respective rib along substantially the whole length of the line and follows a curved path. The load transfer line may be a line, rope, band or textile structure of elongate dimension and may be manufactured from a metal, organic or inorganic material like fibre material or foil material or the like. The load transfer line may be attached to the rib by adhesive glueing, welding, a plurality of stitches or the like. It is to be understood that the load transfer line should be attached along its whole length to the rib to allow load transfer from the load transfer line into the rib via the whole load transfer line.

According to the invention, the load transfer line follows a curved path along the rib. By this it is achieved that the loads transferred to line the attachment points are transferred from the rib via the load transfer line to the attachment points. By this, local stress concentrations in the region of the line attachment points can be reduced or even avoided. A curved path of the load transfer line allows to basically follow a calculated path which significantly or totally reduces the stresses in large regions of the rib and results in a large area of the rib contributing to the load transfer from the line attachment points into the upper deck. By this, the strength and thus the weight of the rib material can be significantly reduced since no reinforcement patches or at least patches of lower strength and weight or the like are required to compensate stress peaks in the material and the material of the rib is exposed to a rather constant stress over its whole dimension.

The specific combination of the aerodynamic wing having the ribs and the load transfer lines according to the invention allows to design an aerodynamic wing wherein the aerodynamic planes are constituted by an upper deck only. By this, it is possible, to omit a lower deck without sacrificing aerodynamic efficiency of the wing to a significant amount or even without decreasing it at all and to further decrease the weight of the aerodynamic wing.

However, it is to be understood, that according to a first preferred embodiment the aerodynamic wing may comprise lower deck extending in operation in a longitudinal direction and in a transversal direction; wherein the lower deck is arranged at a distance from the upper deck and substantially parallel thereto to define an inner space between the lower and the upper deck; wherein the upper and lower deck are shaped and arranged to produce a vertical lifting force which is oriented perpendicular to the longitudinal and the transversal direction when the aerodynamic wing is exposed to a wind flow in a direction oriented parallel to the longitudinal direction; wherein the lower deck and the upper deck are connected by said plurality of ribs. With this preferred embodiment an upper and lower deck define the exterior shape of the aerodynamic wing and an interior space which may serve to accommodate stiffening elements or may be set totally or partially under pressure to exert a stiffening force stabilizing the shape of the aerodynamic wing. Connecting the upper and lower deck with the ribs having the load transfer lines, the strength of the upper and lower deck may be significantly reduced, thus significantly reducing the total weight of the wing.

According to a further preferred embodiment of the invention, the curved path of the reinforcing load transfer line is calculated such that a region of the rib is substantially free of stress caused by the transfer of the vertical uplift force from the wing to the fastening line the region being delimited on the upper side by the path of the reinforcing load transfer line and extending towards the lower end of the ribs between the line attachment points of the first and the second line of the at least two fastening lines, in particular towards the lower deck, if present.

Basically, the loads acting onto an aerodynamic wing according to the introductory portion of this description can be calculated using standard methods like Finite Element Analysis (FEM) or other approaches. The boundary conditions result from the low pressure acting from above the upper deck, the pressure acting from below the upper deck (or lower deck, if present) and—if a lower deck is present—from the pressure resulting from interior pressure in the inner space between the upper and lower deck of the wing on the one hand and the tensile forces acting onto the fastening lines and possible other lines connected to the wing. The forces resulting from the pressure loads have to be transferred into the fastening lines and possible other lines being connected to the aerodynamic wing. In case of an un-accelerated movement of the aerodynamic wing, the forces resulting from the pressures listed above and the loads transferred into the fastening lines and possible other lines must be in equilibrium. The forces acting internally onto a rib of the aerodynamic wing can be calculated based on such assumption of boundary conditions and by this, an ideal path of a load transfer line extending between two line attachment points can be calculated such that the stresses in the rib material below such load transfer line are minimized and the stresses above such load transfer line, i.e. between the load transfer line and the upper deck, are approximately constant at each point of the rib, i.e. any stress peaks are avoided.

By applying the load transfer line in a such calculated curved path, the stress distribution within the rib can be optimized in such a way, that any stress peaks are significantly reduced or even totally avoided and that large areas of the rib are free of stresses or only exhibit low stresses to thus allow significant reduction of strength and weight of the rib material. In other words, by providing and attaching a specifically calculated load transfer line to the rib, the remaining rib material can be reduced significantly with regard to its strength and thickness and weight.

According to a further preferred embodiment of the invention a plurality of fastening lines are secured to each rib at a corresponding plurality of line attachment points arranged at a distance from each other in the longitudinal direction, wherein each two adjacent line attachment points of the plurality of line attachment points lines are connected to each other by a curved reinforcing load transfer line. In particular in case of large scale aerodynamic wings it is preferred to provide more than two fastening lines being attached to each rib. In such case, each two adjacent line attachment points should be connected via a curved reinforcing load transfer line as described above for the two line attachment points of one rib. By this, all attachment points of one rib are connected via a continuous load transfer load transfer line, whereby the load transfer line comprises at least n−1 sections, where n is the number of attachment points. Each section may have a different curvature and a discontinuity may be present between two such sections at a line attachment point in the load transfer line.

Still further, it is preferred that at least one curved reinforcing load transfer line comprises an upper reinforcing load transfer line section and a lower reinforcing load transfer line section, the upper reinforcing load transfer line section following a curved path between two adjacent line attachment points and the lower reinforcing load transfer line section following a curved path between said two adjacent line attachment points, the curved paths of the upper and lower reinforcing load transfer line sections being calculated such that a region of the rib which is substantially free of stress caused by the transfer of the vertical uplift force from the wing to the fastening lines is present between the upper and the lower reinforcing load transfer line sections. With this embodiment two connecting reinforcing load transfer line sections are provided between two adjacent line attachment points, the two load transfer line sections delimiting a region of the rib between them. By this, both loads acting onto the rib from the upper deck and loads acting onto the rib from the lower deck can be transferred to the line attachment points via the load transfer line sections and an optimized stress distribution is achieved in the rib with respect to these loads. Further, the region between the two load transfer line sections is substantially or even completely free of stresses, this can be calculated using standard methods like FEM analysis and designing the curved path of the load transfer line sections according to such calculation. By this, the strength and weight of the rib can be substantially reduced without reduction of the loads which can be transferred via the rib to the line attachment points.

Still further, it is preferred that at least one fastening line attachment point comprises a lower and an upper line attachment point, the lower line attachment point being connected to the upper line attachment point via a straight reinforcing attachment line, said straight reinforcing attachment line preferably extending in the direction of the fastening line, wherein an upper curved reinforcing load transfer line section extends from the upper line attachment point and a lower curved reinforcing load transfer line section extends from the lower line attachment point.

This embodiment can be designed such that the fastening line is fastened to the rib at two or more attachment points, in particular in such a way that the fastening line is attached to the rib between an upper and a lower attachment point along the whole section in between. Such embodiment is particularly preferred in large scale aerodynamic wings since the stress distribution can be further optimized when providing such two fastening line attachment points.

Still further it is preferred that an additional straight reinforcing line is provided between two adjacent line attachment points. Such straight reinforcing line can have the effect that the region of reduced stresses or even the stressless region in a rib can be extended towards the rib contour, i.e. beyond the region delimited by the load transfer lines. It is to be understood in this context that the straight reinforcing line as well as the load transfer lines or load transfer line sections can be designed as lines, webs, bands, wovens or nowovens or the like to achieve the advantages provided with the invention. By providing an additional straight reinforcing line the overall weight of the rib can be significantly further reduced, in particular it becomes possible to cut out a stressless region delimited by an upper and lower load transfer line section.

According to a still further embodiment, a plurality of fastening lines are secured to each rib at a corresponding plurality of line attachment points arranged at a distance from each other in the longitudinal direction, the plurality of fastening lines comprising a front fastening line, a rear fastening line and at least one intermediate fastening line, whereby a closed curved reinforcing load transfer line extends from the line attachment point of the front and/or the rear fastening line.

Such embodiment comprising a plurality of fastening lines is particularly useful for large scale aerodynamic wings. In such case, it has been shown by the inventors of the present inventions that a closed curved reinforcing load transfer line at the front and/or the rear end of the rib is able to extend the stressless region close to the front end and/or the rear end, respectively. In particular, such closed curved reinforcing load transfer line can circumscribe a contour, the limit of the closed curved reinforcing load transfer line including the line attachment point of the front or the rear fastening line, respectively. The closed curved reinforcing load transfer line will then delimit a region in its centre which is a region of significantly reduced stresses or even a stressless region.

Still further it is preferred that a plurality of fastening lines are secured to each rib at a corresponding plurality of line attachment points arranged at a distance from each other in the longitudinal direction, the plurality of fastening lines comprising a front fastening line, a rear fastening line and at least one intermediate fastening line, whereby the front and/or the rear fastening line are fastened to a fastening line attachment point comprising a lower and an upper line attachment point, and whereby a curved reinforcing load transfer line extends from the lower to the upper line attachment point of the front and/or the rear fastening line.

This embodiment realizes the advantages of the foregoing preferred embodiment and still further uses the advantages of a lower and an upper line attachment point for the front or the rear fastening line, respectively. In this embodiment, the region of reduced stresses of the stressless region at the front or the rear part of the rib, respectively, is delimited by a straight line between the lower and upper line attachment point and the curved reinforcing load transfer line extending from the lower to the upper line attachment point. Thus, in this embodiment as in the foregoing embodiment, a closed region is delimited by a line including the front or rear line including the front or rear line attachment points, respectively.

According to a still further preferred embodiment the fastening lines extend between a rib and a steering unit, the steering unit being coupled to a base platform via one tractive cable. With this embodiment, the overall weight of the aerodynamic wing and its steering facilities, like steering lines, actuators or the like can be further reduced by providing a steering unit which is arranged close to the lower deck of the wing and into which all fastening lines and steering lines are connected whereas the steering unit itself is connected to the base platform via only one tractive cable. Thus it is possible to reduce the weight of those parts of the system which have to be carried by the uplift force of the aerodynamic wing and to thus increase the efficiency of the whole system.

Still further it is preferred that at least two of the fastening lines functionally act as steering lines in that they are coupled to a steering unit in such a way that they can be hauled in and veered out to effect a deformation of the aerodynamic wing. It should be understood, that all fastening lines of one rib or at least some of the fastening lines of one rib can act as steering lines without changing the design of the attachment of the fastening lines to the rib.

According to a further preferred embodiment the reinforcing load transfer line comprises a webbing sewn to the rib. By this, a reliable technique is applied for connecting the load transfer line to the rib thus ensuring safe load transfer from the rib to the load transfer line and further to the line attachment points.

According to a further preferred embodiment a sheath is formed along the curved path of the reinforcing load transfer line, and the reinforcing load transfer line is arranged within said sheath. With this embodiment, a replacement of the load transfer line is simplified and it becomes possible to use different materials for the sheath and the load transfer line, thus allowing material optimization with respect to weight, strength and costs.

Still further, this embodiment can be further improved in that the reinforcing load transfer line is arranged slidable along the sheath, whereby the at least two fastening lines are secured to the rib at the two line attachment points by coupling said fastening lines to ends of the reinforcing load transfer line. By this, peak forces resulting from rotation of the wing around its transverse axis may be reduced or even compensated by allowing a temporary shortening and elongation of the fastening lines by a sliding movement of the load transfer lines within the sheath.

According to a final preferred embodiment at least one reinforcing transverse load transfer line is provided, the at least one reinforcing transverse load transfer line connecting two fastening lines arranged in distance to each other in a transverse direction of the aerodynamic wing. The at least one reinforcing transverse load transfer line may preferably be arranged adjacent to each other. Whereas the aforementioned reinforcing load transfer lines are arranged for load transfer between two fastening lines substantially arranged in distance to each other in a longitudinal direction of the aerodynamic wing, i.e. in the flight direction of the wing, the reinforcing transverse load transfer lines according to this embodiment will substantially reinforce the wing in a transverse direction, i.e. in a direction perpendicular to the flight direction. The reinforcing transverse load transfer lines may be straight thus effecting a reinforcement in normal flight condition. the reinforcing transverse load transfer lines may be attached to the fastening lines only at the ends of each reinforcing transverse load transfer line, respectively. Alternatively or additionally, the reinforcing transverse load transfer lines may be attached along their whole length to the upper or lower deck. The reinforcing transverse load transfer lines additionally ensure that the wing is not separated in two or more segments in case of extreme overload situations but is kept in a steerable condition even if the upper and/or lower deck is riptorn partially or totally along a substantially longitudinaltearing direction.

The aforementioned preferred embodiment may be further improved by arranging the reinforcing transverse load transfer line parallel to the upper or lower deck, preferably along the upper or lower deck, respectively. By this, an optimized load transfer path is provided along the reinforcing transverse load transfer lines and the aerodynamic effected by the reinforcing transverse load transfer lines may be significantly reduced.

BRIEF DESCRIPTION OF THE DRAWINGS

Preferred embodiments of the invention are described with reference to the figures, wherein.

DETAILED DESCRIPTION

Figure 1:
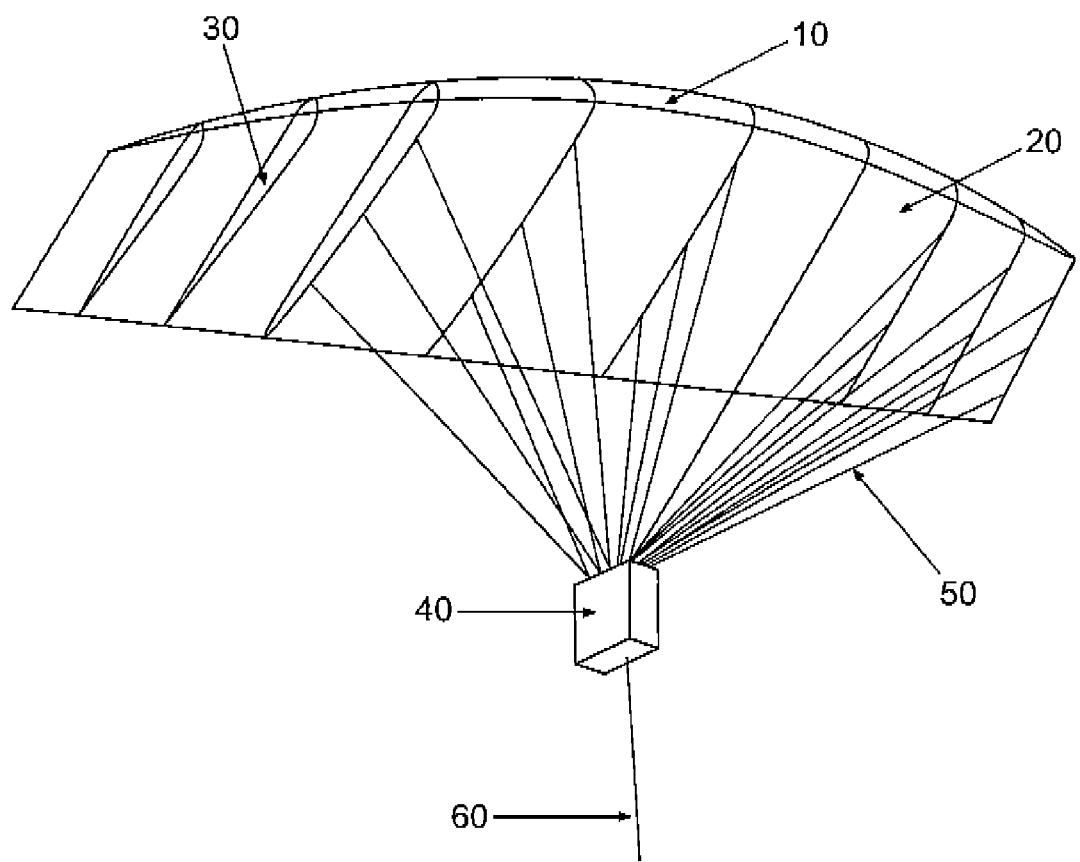
FIG. 1: A general perspective view from bottom side direction showing an aerodynamic wing according to the invention connected via a plurality of fastening lines to a steering unit located close below the aerodynamic FIG. 2 A schematic side elevational view of one single rib connecting an upper deck and a lower deck of an aerodynamic wing according to a first embodiment of the invention.

As depicted in FIG. 1, an aerodynamic wing according to the invention comprises an upper deck 10 and a lower deck 20. The upper deck 10 is coupled to the lower deck 20 via a plurality of ribs 30. Close below the aerodynamic wing a steering unit 40 is located. The steering unit is connected to the aerodynamic wing via a plurality of fastening lines 50.

The fastening lines 50 extend between the steering unit 40 and are secured to the ribs 30 of the aerodynamic wing at a plurality of line attachment points distant to each other.

The steering unit 40 is connected to a base platform via a long tractive cable 60 to transfer the uplift forces generated by the aerodynamic wing to the base platform.

Figure 2:
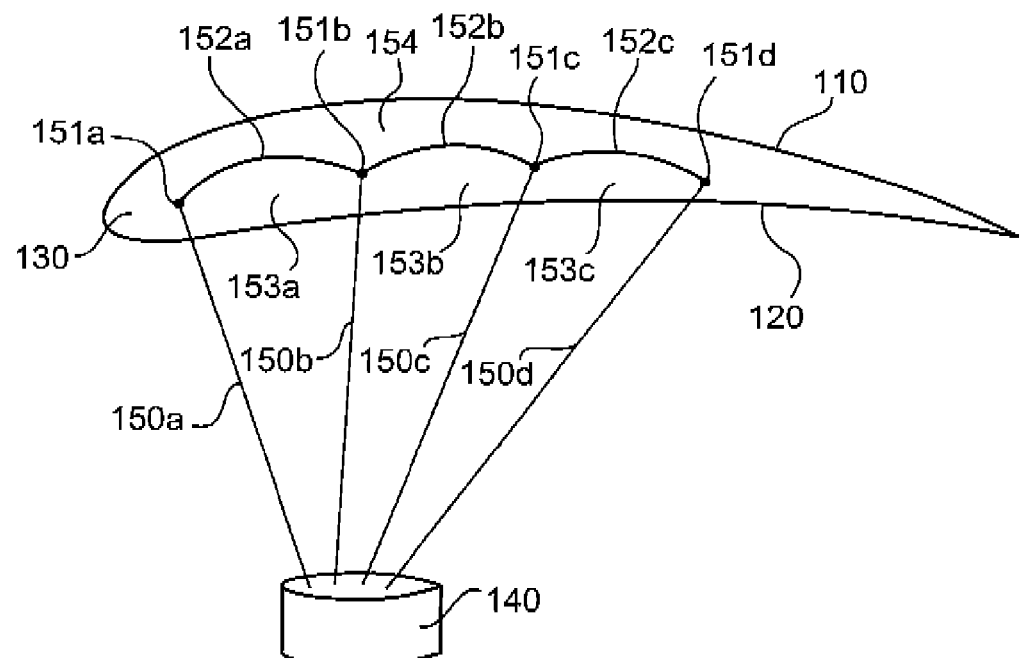

According to a first preferred embodiment shown in FIG. 2, each rib 130 is connected via four fastening lines 150$a$-$d$ to the steering unit 140. Each fastening line 150$a$-$d$ is secured to the rib 130 at a line attachment point 151$a$-$d$. The line attachment points 151$a$-$d$ are arranged in distance to each other in the longitudinal direction designated "L" of the rib.

As can be seen from FIG. 2, each two adjacent line attachment points 151$a$, $b$; $b$,$c$; $c$,$d$, respectively, are connected via a curved load transfer line 152$a$-$c$ which is provided by a reinforcing webbing attached via welding and sewing to the rib. The curvature of the curved load transfer lines 152$a$-$c$ is calculated such that regions 153$a$-$c$ below the curved load transfer lines 152$a$-$c$ are substantially free of stress and may thus be provided as holes in the rib to save weight of the whole aerodynamic wing. Still further, the curvature of the curved load transfer lines 152$a$-$c$ is calculated such that the regions between the upper deck 110 of the aerodynamic wing and the load transfer lines 152$a$-$c$ is loaded with a substantial constant stress thus avoiding any stress peaks in the rib and allowing a continuous design of the rib with respect to its material strength and thickness.

Figure 3:
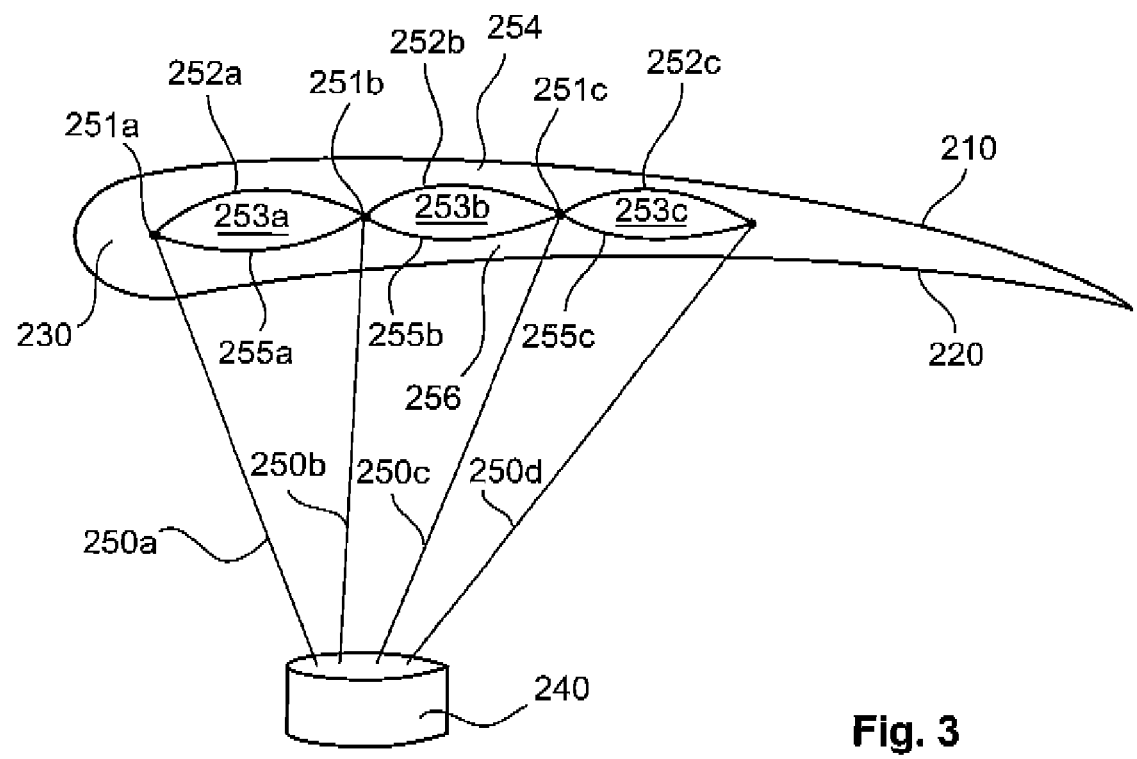
FIG. 3 A schematic side elevational view of one single rib connecting an upper deck and a lower deck of an aerodynamic wing according to a second embodiment of the invention.

FIG. 3 shows a second embodiment of a rib 230 connecting an upper deck 210 and a lower deck 220. As can be seen from FIG. 3, the rib 230 is connected to a number of four fastening lines 250$a$-$d$ at four line attachment points 251$a$-$d$ to a steering unit 240 located close below the aerodynamic wing.

Each two adjacent line attachment points 251$a$,$b$; $b$,$c$ and 251$c$,$d$ are connected to each other via an upper load transfer line 252$a$-$c$, respectively and a lower load transfer line 255$a$-$c$, respectively.

The upper load transfer lines 252$a$-$c$ follow a curved path which is bent in the direction towards the upper deck 210. The lower load transfer lines 150$a$-$c$ follow a curved path which is bent towards the lower deck 220.

The curvature of the load transfer lines 252$a$-$c$ and 255$a$-$c$ is calculated such that regions 153$a$-$c$ encircled by the upper and lower transfer lines between each two adjacent line attachment points are totally free of stress and may thus be provided as holes in the rib 230. Still further, the curvature is calculated such that a region 254 between the upper load transfer lines 252$a$-$c$ and the upper deck 210 is loaded with a constant stress thus avoiding any stress concentrations or peaks therein and allowing to design the material of the web in this region 254 with constant and small material thickness and strength.

Still further, the curvature of the load transfer lines 252$a$-$c$ and 255$a$-$c$ is calculated such that a region 256 between the lower load transfer lines 255$a$-$c$ and the lower deck 220 is loaded with a constant stress thus avoiding any stress concentrations or peaks in this region and allowing to design the material of the rib with constant thickness and strength.

Figure 4:
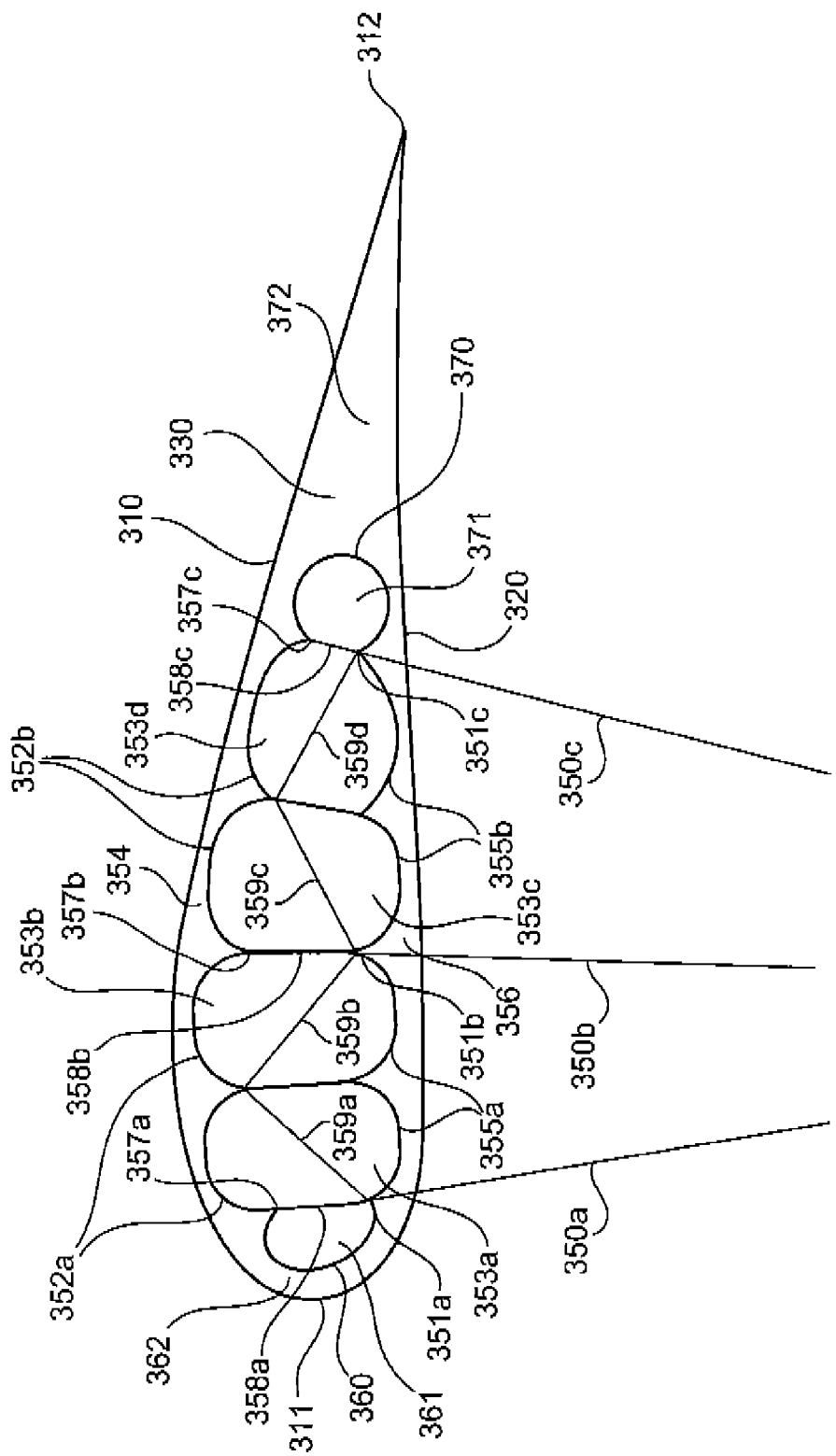
FIG. 4: A schematic side elevational view of one single rib connecting an upper deck and a lower deck of an aerodynamic wing according to a third embodiment of the invention

FIG. 4 shows a third embodiment of a rib 330 fastened via three fastening lines 350$a$-$c$ to a steering unit 340.

As can be seen from FIG. 4, each fastening line 350$a$-$c$ is secured to the rib via a lower line attachment point 351$a$-$c$ and an upper line attachment point 357$a$-$c$, respectively. Thus, a section 358$a$-$c$ of each fastening line 350$a$-$c$ extends between these lower and upper line attachment points 351$a$-$c$, 357$a$-$c$, respectively.

Each two adjacent upper line attachment points 357$a$-$c$ are connected to each other via a curved load transfer line 352$a$, b, respectively. Further, each two adjacent lower line attachment points 351a-c are connected to each other via lower load transfer lines 355a, b, respectively. Each of the curved load transfer lines comprises two continuously curved load transfer line sections which are connected to each other in a contact point.

Still further, the lower and upper line attachment points 351a-c and 357a-c are connected to each other via straight reinforcing lines 359a-d in a specific pattern. The straight reinforcing lines 359a-d may be attached to the rib 330 along their whole length or only at their ends. As can be seen from the figure, a first reinforcing line comprising two straight reinforcing line sections 359a, b extends between the lower line attachment point 351a to the lower line attachment point 351b. A second straight reinforcing line comprising two straight reinforcing line sections 359 c, d extends between this lower line attachment point 351b to the lower line attachment point 351c. Each first straight reinforcing line section 359a, c extends from a lower line attachment point to a contact point where two continuously curved upper load transfer line sections are in contact. Accordingly, each second straight reinforcing line section 359b, d extends from said contact point to a lower line attachment point.

It is to be understood that the design of the straight reinforcing lines 359a-d could be altered and such straight reinforcing lines may either be provided between adjacent lower line attachment points or adjacent upper line attachment points or from a lower to an upper line attachment point. It is preferred that the straight reinforcing lines extend from one line attachment points to each two adjacent lower or upper line attachment points since this is preferable for the stress distribution within the rib. However, in other configurations, one line attachment point may only be connected to one adjacent line attachment point via one straight reinforcing line, either.

The curvature of the upper and lower load transfer lines 352a-c and 355a-c and the load transfer via the straight reinforcing lines 359a-d in connection with the line sections 358a-c of the fastening lines 350a-c are calculated such that the regions 353a-d encircled by the upper and lower load transfer lines and further delimited by the line sections 358a-e are totally free of stress and may thus be provided by holes in the rib whereby the straight reinforcing lines 359a-d run across theses holes.

In the embodiment shown in FIG. 4, a region 354 between the upper load transfer lines 352a-c and the upper deck 310 and a region 356 between the lower load transfer lines 355a-c and the lower deck 320 is loaded with a constant stress exerted by the load transfer of the aerodynamic forces acting onto the upper and lower deck to the fastening lines. By this, the material strength and thickness of the rib material in these regions 354, 356 may be reduced to a minimum value since no stress peaks or concentrations are present in the rib.

As can be further seen from the embodiment shown in FIG. 4, a curved front load transfer line 360 extends between the lower and upper front line attachment point 351a, 357a and is bent in a direction towards the front end 311 of the aerodynamic wing. In the same manner, a rear load transfer line 370 extends between the lower and upper line attachment point 351e, 357e and is bent in the direction towards the rear end 312 of the aerodynamic wing. These load transfer lines 360, 370 encircle a region 361, 371 which is free of stress and may thus be provided as hole in the web, too.

Still further, the curvature of the load transfer lines 360, 370 is calculated such that a region 362 between the front load transfer line 360 and the front end of the upper and lower deck is loaded with constant stress as well as a region 372 between the rear load transfer line 370 and the rear sections of the upper and lower deck. This allows to reduce material strength and thickness in these regions of the web to a minimum value since no stress concentrations or peaks are present here.

As can be seen from the foregoing explanation to FIG. 4 in the embodiment shown in FIG. 4, any stress concentrations or peaks are avoided in the whole rib 330 thus allowing a minimum material strength and thickness in the whole web. By such design, the overall weight of an aerodynamic wing can be reduced significantly without the risk of material failure due to stress peaks, overloads or the like.

The invention claimed is:

1. An aerodynamic wing, comprising
an upper deck (10) extending in operation in a longitudinal direction and in a transversal direction;
  i. wherein the upper deck is shaped and arranged to produce a vertical lifting force which is oriented perpendicular to the longitudinal and the transversal direction when the aerodynamic wing is exposed to a wind flow in a direction oriented parallel to the longitudinal direction;
  ii. wherein a plurality of ribs (30) are connected to the upper deck, said ribs lying in a plane parallel to the direction of the vertical lifting force and the direction of the wind flow;
a lower deck (20) extending in operation in a longitudinal direction and in a transversal direction;
  i. wherein the lower deck is arranged at a distance from the upper deck and substantially parallel thereto to define an inner space between the lower and the upper deck;
  ii. wherein the upper and lower deck are shaped and arranged to produce a vertical lifting force which is oriented perpendicular to the longitudinal and the transversal direction when the aerodynamic wing is exposed to a wind flow in a direction oriented parallel to the longitudinal direction;
  iii. wherein the lower deck and the upper deck are connected by said plurality of ribs (30)
the aerodynamic wing being coupled to a base platform arranged below the wing in service via a plurality of fastening lines (50a-d),
characterized in that
the fastening lines (50a-d) are secured to the ribs (30) of the wing,
at least two fastening lines (50a-d) are secured to each rib at two line attachment points (51a-d) arranged at a distance from each other in the longitudinal direction;
wherein the at least two line attachment points (51a-d) are connected to each other by a reinforcing load transfer line (52a) extending from the line attachment point (51a) of the first one of the two fastening lines to the line attachment point (51b) of the second one of the two fastening lines;
whereby the reinforcing load transfer line (52a) is attached to the respective rib (30) along the whole length of the load transfer line and follows a curved path along the rib, wherein
said curved reinforcing load transfer line comprises an upper reinforcing load transfer line section (252a-c) and a lower reinforcing load transfer line section (255a-c),
the upper reinforcing load transfer line section following a curved path which is bent in a direction towards the upper deck in between said two adjacent line attachment points and the lower reinforcing load transfer line section following a curved path which is bent in a direction towards the lower deck between said two adjacent line attachment points.

2. An aerodynamic wing according to claim 1, wherein the curved path of the reinforcing load transfer line (52a) is configured such that a region (53) of the rib is substantially free of stress caused by the transfer of the vertical uplift force from the wing to the fastening lines, the region (53) being delimited on the upper side by the path of the reinforcing load transfer line (52a-c) and extending towards the lower end of the ribs between the line attachment points (51a-d) of the first (50a) and the second (50d) line of the at least two fastening lines, in particular towards the lower deck.

3. An aerodynamic wing according to claim 1, wherein
a plurality of fastening lines are secured to each rib at a corresponding plurality of line attachment points arranged at a distance from each other in the longitudinal direction,
wherein each two adjacent line attachment points of the plurality of line attachment points lines are connected to each other by said curved reinforcing load transfer line.

4. An aerodynamic wing according to claim 3, wherein
at least one of said plurality of fastening line attachment point comprises a lower (351a-c) and an upper (357a-c) line attachment point,
the lower line attachment point being connected to the upper line attachment point via a straight reinforcing attachment line (358a-c), said straight reinforcing attachment line extending in the direction of the fastening line,
wherein said upper curved reinforcing load transfer line section (352a, b) extends from the upper line attachment point and
said lower curved reinforcing load transfer line section (355a, b) extends from the lower line attachment point.

5. An aerodynamic wing according to claim 1 wherein
at least one additional straight reinforcing line (359a-d) is provided between two adjacent line attachment points.

6. An aerodynamic wing according to claim 1 wherein
a plurality of fastening lines are secured to each rib at a corresponding plurality of line attachment points arranged at a distance from each other in the longitudinal direction,
the plurality of fastening lines comprising a front fastening line, a rear fastening line and at least one intermediate fastening line,
whereby said curved reinforcing load transfer line forms a closed curved reinforcing load transfer line extending from at least one of the line attachment point of the front and the rear fastening line attachment point.

7. An aerodynamic wing according to claim 1 wherein
a plurality of fastening lines are secured to each rib at a corresponding plurality of line attachment points arranged at a distance from each other in the longitudinal direction,
the plurality of fastening lines comprising a front fastening line, a rear fastening line and at least one intermediate fastening line,
whereby at least one of the front and the rear fastening line are fastened to a fastening line attachment point comprising a lower and an upper line attachment point, and
whereby said curved reinforcing load transfer line extends from the lower to the upper line attachment point of the front and/or the rear fastening line.

8. An aerodynamic wing according to claim 1 wherein
the fastening lines extend between said rib and a steering unit, the steering unit being coupled to said base platform via one tractive cable.

9. An aerodynamic wing according to claim 1 wherein
at least two of the fastening lines functionally act as steering lines in that they are coupled to a steering unit in such a way that they can be hauled in and veered out to effect a deformation of the aerodynamic wing.

10. An aerodynamic wing according to claim 1 wherein
the reinforcing load transfer line comprises a webbing sewn to the rib.

11. An aerodynamic wing according to claim 1 wherein a reinforcing transverse load transfer line is provided connecting two fastening lines arranged a distance from each other in a transverse direction of the aerodynamic wing.

12. An aerodynamic wing according to claim 11, wherein the reinforcing transverse load transfer line is arranged parallel to the upper or lower deck.

* * * * *

UNITED STATES PATENT AND TRADEMARK OFFICE
CERTIFICATE OF CORRECTION

| | | |
|---|---|---|
| PATENT NO. | : 8,695,924 B2 | Page 1 of 1 |
| APPLICATION NO. | : 12/995161 | |
| DATED | : April 15, 2014 | |
| INVENTOR(S) | : Specht et al. | |

It is certified that error appears in the above-identified patent and that said Letters Patent is hereby corrected as shown below:

In the Claims

Column 11, claim 2, line 14, delete "in particular";

Column 12, claim 7, line 21, delete "and/or" and insert --and--.

Signed and Sealed this
Twenty-ninth Day of July, 2014

Michelle K. Lee
*Deputy Director of the United States Patent and Trademark Office*